United States Patent
Lita et al.

(10) Patent No.: US 10,453,070 B2
(45) Date of Patent: Oct. 22, 2019

(54) NON-INVASIVE SAMPLING AND FINGERPRINTING OF ONLINE USERS AND THEIR BEHAVIOR

(75) Inventors: Lucian Vlad Lita, Sunnyvale, CA (US); Michael David Bigby, Los Gatos, CA (US)

(73) Assignee: BLUE KAI, INC., Bellevue, WA (US)

( * ) Notice: Subject to any disclaimer, the term of this patent is extended or adjusted under 35 U.S.C. 154(b) by 364 days.

(21) Appl. No.: 13/161,373

(22) Filed: Jun. 15, 2011

(65) Prior Publication Data

US 2012/0323694 A1   Dec. 20, 2012

(51) Int. Cl.
*G06Q 30/00*   (2012.01)
*G06F 7/00*    (2006.01)
*G06F 9/44*    (2018.01)

(52) U.S. Cl.
CPC .............. *G06Q 30/00* (2013.01); *G06F 7/00* (2013.01); *G06F 9/44* (2013.01)

(58) Field of Classification Search
CPC combination set(s) only.
See application file for complete search history.

(56) References Cited

U.S. PATENT DOCUMENTS

| | | | |
|---|---|---|---|
| 7,523,123 B2 * | 4/2009 | Yang et al. | |
| 8,027,864 B2 * | 9/2011 | Gilbert | 705/7.31 |
| 8,069,176 B1 * | 11/2011 | Ioffe et al. | 707/747 |
| 8,150,723 B2 * | 4/2012 | Chen et al. | 705/7.29 |
| 8,190,610 B2 * | 5/2012 | Dasdan et al. | 707/737 |
| 8,364,682 B1 * | 1/2013 | Gershony et al. | 707/739 |
| 8,412,665 B2 * | 4/2013 | Wang et al. | 706/52 |
| 8,442,863 B2 * | 5/2013 | Chandramouli et al. | 705/14.43 |
| 2007/0239517 A1 * | 10/2007 | Chung et al. | 705/10 |
| 2009/0300009 A1 * | 12/2009 | Rezaei et al. | 707/5 |
| 2010/0293057 A1 * | 11/2010 | Haveliwala | G06Q 30/0269 705/14.66 |

(Continued)

OTHER PUBLICATIONS

Eckersley, P., "How Unique Is Your Web Browser?" Electronic Frontier Foundation, May 17, 2010, 19 pages.

(Continued)

*Primary Examiner* — Eric R Netzloff
*Assistant Examiner* — Dipen M Patel
(74) *Attorney, Agent, or Firm* — Kilpatrick Townsend & Stockton, LLP

(57) ABSTRACT

A system, method, apparatus, and processor readable non-transitive storage media are described for matching items in large datasets based on non-invasive fingerprints of users so that collected metric data for advertisements (media) and behavioral data may be reconciled and analyzed. Since user fingerprints may not generate a unique one to one correspondence or mapping under certain constraints, the various embodiments employ a sampling method that optimally matches the output of a random sampling of non-invasive fingerprints. The use of non-invasive fingerprints and specialized sampling enables the various embodiments to provide advanced analytics for advertising content and metric data in targeted behavior advertising campaigns. To compare impressions with user profile data, the various embodiments employ in part the time stamp dimension of user profiles to generate temporally unique persistent non-invasive fingerprints.

29 Claims, 5 Drawing Sheets

FIG. 5

(56) References Cited

U.S. PATENT DOCUMENTS

2011/0060905 A1* 3/2011 Stack ................... G06Q 10/10
                                                    713/167
2011/0066496 A1* 3/2011 Zhang et al. ............. 705/14.53
2012/0016836 A1* 1/2012 Fender .................. G06Q 10/10
                                                    707/603

OTHER PUBLICATIONS panopticlick.eff.org, Electronic Frontier Foundation, accessed Feb. 16, 2011, 2 pages.

* cited by examiner

NON-INVASIVE SAMPLING AND FINGERPRINTING OF ONLINE USERS AND THEIR BEHAVIOR

TECHNICAL FIELD

This application is directed to managing the online behavioral information of an audience, and more particularly, to providing audience behavioral information that can be employed as a basis for the targeting of online advertisement campaigns.

BACKGROUND

The online advertising industry uses data (in particular behavioral targeting data) to fuel advertising campaigns by optimizing ad placement, ad content, real-time bidding etc. This data is also referred to as "audience data", since it is associated with a set of users—it includes demographic data (e.g. gender, age), psychographic data (e.g. interests, opinions), geographic data (e.g. zip code, state), as well as in-market data (e.g. users being in market for luxury cars, travel to Polynesia, etc). Audience data is aggregated from multiple sources over time from users' multiple online actions and is typically organized around individual users into online user profiles. These user profiles are usually de-identified—i.e. no personal identifiable information such as name, email address, SSN is included.

The online advertising industry is results driven: ad campaign metrics are implemented and monitored constantly—behaviorally targeted advertising being the most sensitive to performance; advertisers most frequently adjust and tune the answer to the question "what user audience should a campaign target to optimize a set of key performance indicators?" Due to expected high performance, behaviorally targeted ad campaigns are bought at a premium price. This leads advertisers to plan and model the results of these campaigns in advance, even before the campaigns are commissioned.

Additionally, when advertisers run media campaigns, they track metrics such as conversion rate and effective CPM (cost per thousand impressions) rates, to determine campaign effectiveness. During a campaign, as well as after a campaign has run, the advertisers want to assess pertinent information, including: (1) how effective would a campaign be if a certain type of behavior targeting data was used, such as West Coast green shoppers, who have two or more children; (2) how effective would a campaign be if the behavior targeting data was provided by one source vs. multiple sources; and (3) analytics—what are useful characteristics of converters (users who end up reaching an end-goal, e.g. purchasing a product, visiting a website etc): e.g. converters are twice as likely to be in market for a trip to Southeast Asia, but less likely to buy a luxury automobile compared to the average web user. Answering these questions provides useful analytics in the form of actionable insights, meaningful metrics, and better campaign planning and performance optimization.

Online advertising systems have at their disposal considerable information to assist in the process of campaign planning, yet significant hurdles exist to make behavior targeting usable—for example if behavioral data is available in aggregate but cannot be linked to individual impressions or users, its usefulness is limited and its impact on ROI reduced. For example, campaign planners typically have access to (i) impression log data, which contain the individual impressions served: a unique user identifier, the impression timestamp, creative id, placement id, creative type, creative size etc. Campaign planners also leverage (ii) behavioral targeting data, which is collected and managed separately by a different set of vendors; this data also includes a unique user identifier, user's actions on multiple websites and their timestamps etc. Since the two types of data (i) and (ii) are typically collected and managed disjointly, the unique identifiers assigned to users are different and are usually not reconciled. This implies that while planners can understand in aggregate what data works best at a campaign level, they cannot drill down and segment their audiences by performance—i.e. combining impression (media) data with audience data at the individual user level.

To reconcile the two types of data, a process should allow the two sets of user id's to be comparable—e.g., provide a mapping function that correctly assigns a user id from each space to a single user. This mapping can connect a user's online actions to a set of impressions the same user is subsequently exposed to, and possibly to a set of conversions.

Currently, it is difficult to allow user identifiers to be shared, reconciled, or mapped into a common id space. Without such a process, it is difficult to: (1) assess the performance of behavior targeting data in advertising campaigns; (2) provide analytic insights regarding the types of users (profiles) who are shown impressions, click, and convert versus the rest of the user pool; and (3) optimize advertising campaigns to focus on data that leads to the best results (e.g. leading to higher conversion rates).

Typically the flow of data from collection, aggregation, decision, real time bidding, and impression occurs unidirectionally. For example, a user ID at the time of collection is matched against a user in an advertising network for the purpose of deciding how much to bid for an impression. However, the initial user ID is often not propagated further and the connection is lost, i.e., the advertising network does not know the user ID assigned by the behavioral targeting data vendor, only the user ID that it has assigned to the user.

Also, when impressions are reported back to the advertiser, the lack of an explicit unique identifier (user ID) makes it difficult for the advertiser to determine the effectiveness of the behavior targeting data. This lack of direct feedback can lead to poor planning, modeling and optimization. Additionally, the advertiser lacks advanced analytics comparing the performance of media and impressions across different audiences.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the various embodiments, reference is made to the following Detailed Description Of The Embodiments, which is to be read in association with the accompanying drawings, wherein.

DESCRIPTION OF THE VARIOUS EMBODIMENTS

Figure 1:
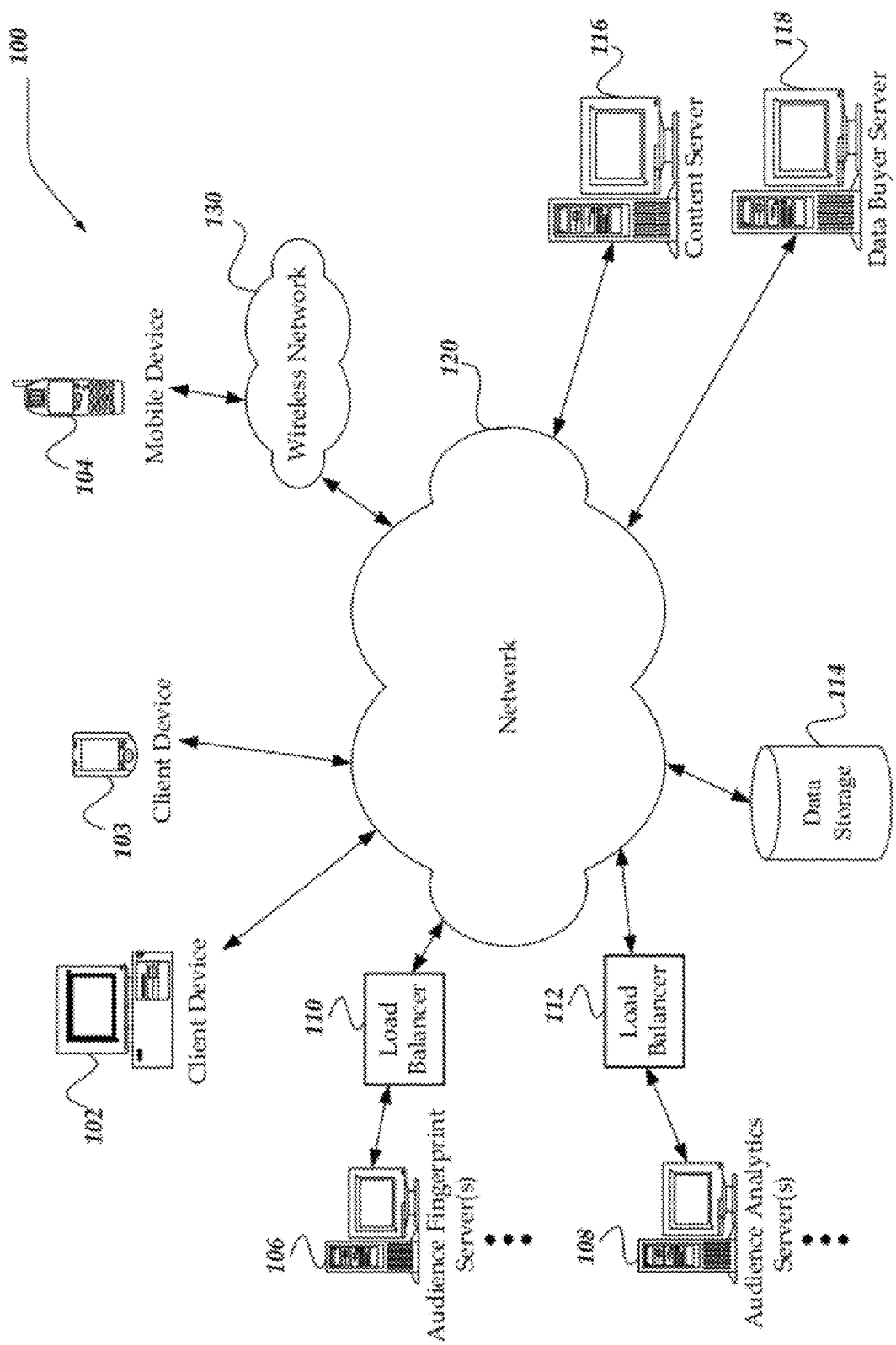
FIG. 1 illustrates an example of a system in which various embodiments may be practiced.

Various embodiments are described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure is thorough and complete, and fully conveys the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term audience generally refers to a collection of people who have exhibited in the past or are likely to exhibit in the future a set of online or offline behaviors and actions, have otherwise directly or indirectly communicated and/or exhibited a predisposition towards or predilection for certain products, events, or entities, and/or have directly or indirectly indicated their affinity, inclusion or exclusion in certain groups (e.g. demographic) or categories. Lack of behavior and negative affinity could also be used as defining qualities of an audience. Such people may be web users who have exhibited certain online behavior (e.g. browsing, search, purchase, Really Simple Syndication (RSS) feed, social network activity, forum posting, and the like).

The term audience may also refer to or incorporate a set of users who have visited a particular website or set of websites. Examples of audience of this type include a) people who visited a specific online bookstore website, and b) women interested in green technology who visited three pre-specified automobile comparison websites sometime in the last month. The latter example combines demographic, site-visiting, and in-market audience components. Some embodiments may enable the user requesting the audience forecast to issue queries related to their own website(s) (e.g. for retargeting purposes). For example, an audience may be defined as women between the ages of 30 and 50, who are in market for European travel, and who have visited my website A but not my website B in the last 60 days. Additionally, in some embodiments, various audience components may be pertinent to an advertising campaign, data modeling, audience analysis and optimization, and the like.

The term audience may also refer to the collection of people who see, experience, or are otherwise exposed to or potentially exposed to a campaign such as an advertising campaign, targeted behavior advertising campaign, a promotional campaign, an informational campaign, or the like. Such people may be web users who may experience a campaign through advertisements placed on web sites or other web services. Such people may also be consumers who may be exposed to advertising through virtually any medium, including but not limited to television, radio, print, physical displays, and the like. As used herein, person is a broad term that encompasses an individual who may be potentially exposed to a campaign through any medium. A person may also be referred to as a consumer or a user, which is meant broadly as a person who may purchase, express an interest in, or otherwise to exposed to information regarding a good and/or service for sale or otherwise provided at any time during the past, present and/or future.

As used herein, the term audience volume generally refers to a number of people in an audience. In some embodiments, audience volume may be an exact number of individual people. However, the invention is not so limited. In some embodiments, audience volume may be a more or less approximate count of the number of people in an audience, estimated by virtually any estimation process.

As used herein, the term category generally refers to a subject, a behavior, or a topic of data for people in an audience. For example, data for a person who purchased an SUV may be associated with a category of "SUV consumer" and/or broader categories of "automobile consumer" or "light truck consumer." Further, categories may be associated with broad category types. For example, categories related to particular markets for goods and/or services may be classified into a market or in-market type of category. Demographic type categories may include categories related to virtually any demographic statistic, including but not limited to age and gender of a person. Location type categories may be related to geographical location definitions of varying scope. For example, location type categories may include "United States residents", "west coast U.S. residents", "California residents", "Los Angeles County residents", "Burbank residents", and so forth. Seasonal category types may include categories related to particular times of year, seasons, periods of time, and the like. For example, data related to user activities during the winter may be classified in a winter category. Other types of categories may be supported by embodiments without departing from the scope or spirit of the claimed invention.

As used herein, the term "time period" may generally refer to either a contiguous or non-contiguous period of time. A time period may be specified in terms of specific time(s) of day (e.g. 1:00 pm), general time(s) of day (e.g. afternoon), date(s), day(s) of the week (e.g. Tuesday), types of day(s) of the week (e.g. weekday, weekend), month(s) of the year, season(s) of the year, holiday(s), holiday season(s), and the like. A time period may be a specified range of time (e.g. from date X to date Y), a span of time immediately prior to or before a particular date (e.g. the month prior to date X), or a span of time generally prior to a particular date (e.g. any month prior to date X). A time period may be non-contiguously defined as omitting dates (e.g. the month prior to date X except for weekend days). In general, time period as used herein may encompass virtually any description of time.

As used herein, the term "timestamp" may generally refer to a specific point in time when an action occurs. A timestamp may be specified in any human readable form (e.g. Mar. 24, 2011 11:50:03) or through Unix time or POSIX time (e.g. 1303754810), which is a format for describing specific points in time, and the like. Unix time defines time as the number of seconds elapsed since midnight Coordinated Universal Time (UTC) of Jan. 1, 1970, not counting leap seconds.

As used herein, the term "fingerprint" may generally refer to identifying strings of information sufficient to identify a particular browser (and indirectly a particular user) and assign a virtual user ID. These strings of information may include: (1) User Agent—browser version, operating system version, natural language, toolbars, and the like; (2) HTTP header—ACCEPT and the like; (3) Cookie—if enabled, those stored by the browser; (4) screen resolution; (5) time zone; (6) Fonts—types and sizes of system fonts; (7) Supercookies—FLASH, Silverlight, HTML 5 databases, or DOM global storage; and (8) IP address—IP address, its subnet, or an Autonomous System Number, and the like.

Briefly stated, various embodiments are directed toward matching items in large datasets based on non-invasive fingerprints of users so that collected metric data for advertisements (media) and behavioral data may be reconciled and analyzed. Since user fingerprints may not generate a unique one to one correspondence or mapping under certain constraints, the various embodiments employ a sampling method that optimally matches the output of a random sampling of fingerprints. The use of non-invasive fingerprints and specialized sampling enables the various embodiments to provide advanced analytics for advertising content and metric data in targeted behavior advertising campaigns. To match impressions with user profile data, the various embodiments employ in part the time stamp dimension of user profiles to generate temporally unique persistent fingerprints.

For at least some of the various embodiments, a process may be employed to construct a user profile dataset "P" over time with real time or offline user actions such as a purchase or comparison shopping, and an impression dataset "I" e.g., an advertising network impression log that may include known user IDs. The process performs a series of actions, including: (1) filtering the user profile dataset "P" for profiles that are older than a particular period of time, such five days or more; (2) computing a fingerprint "f" for each user profile p based on available information such as an IP address, browser type, operating system, plug in applications, installed fonts, and the like; (3) filtering the fingerprints and keeping those fingerprints "f" that correspond to less than "k" user profiles "p"; (4) identifying the remaining set of user profiles "Q" which contain profiles that generate unique fingerprints within a certain time period "t" and with a tolerated unique margin of "k"; (5) compute the fingerprints of a second impression dataset "I" which means that for each advertising content there is a fingerprint "g"; (6) join the two datasets "I" and "Q" and keep those impressions and profiles with fingerprints in both datasets, so that a new merged dataset "Z" includes a user profile and a set of impressions for a unique user; (7) generate an estimated confidence for the correspondence between the data set of merged profile impressions "Z" and the unique users; and (8) use the dataset "Z" for analytics that require both impressions and full user profiles.

The process listed above may be employed by various embodiments to generate a merged dataset with data and media. Many variations of this process are possible: e.g. use different elements to compute the fingerprint, use additional parameters, merge more than two datasets, merge the same dataset from multiple points in time, and the like. The process can also be extended to datasets other than impressions and data.

In the past, fingerprinting has been invasive and relatively effective, or non-invasive and relatively ineffective. For example, invasive fingerprinting often requires that a user download executable code, such as a javascript, that is run in the user's browser application to collect details about plug-in applications, clock skew, the specific system fonts available in their operating system, and the like. Based on these multiple strings of information, a fingerprint such as a hash can be computed that has a relatively high probability of being unique. This fingerprint can be used as a virtual user id, which persists even when the user clears their cookies. While accurate, downloading an application to generate a virtual user ID is invasive and can raise privacy issues, if particular details that a user may not want to share are communicated to a third party.

Non-invasive fingerprinting employs strings of information that a browser application automatically provides when requesting to load a webpage, e.g., a browser type and version, an operating system and version, and an IP address. These strings of information are not particularly informative and the corresponding fingerprint is rarely unique. For example, several thousand users might reside behind a firewall/proxy at a large corporation that employs a small number of outward facing IP addresses, and each user's desktop may be standardized with a particular version of a browser and a version of an operating system. Since the firewall IP address(es), browser version, and operating system version are likely the same for each user, their corresponding fingerprints are non-unique. As another example, users that use dynamic IP addresses and employ standard browser and operating system combinations are often not distinguishable, since the user's IP addresses can dynamically change without an external visible signal. Many large businesses and some wealthy individuals purchase static IP addresses that are reserved for their exclusive use, but that is not the case for most users.

For the various embodiments to run analytics across multiple data sources and compute statistics, the joint dataset "Z" approximately mimics a random sample (controlling for the profile age, size and the additional constraints used). If this is not the case, the conclusions drawn from the "Z" dataset may be flawed. To verify the correctness of the sampled "Z" dataset, a set of statistics can be used for comparison e.g., average profile size, frequency of a particular profile attribute, and the like. An even more rigorous conclusion can be drawn from comparing average distributions e.g., using a KL divergence.

To circumvent existing obstacles running analytics for a sampling of the "Z" database, the various embodiments may employ a combination of methodologies, including: (1) employ non-random sampling to reduce ambiguity; (2) ensure the sampling is correct by mimicking properties of the original dataset; and (3) since there are billions of impressions and user profiles to sample, even a single, second or third order of magnitude dataset reduction still yields a relatively large sample that is useful for analytics.

For example, there might be 250 million user profiles in the USA to sample, and if only less than one percent is identified as unique, that is still more than a million unique user profiles to run analytics on.

A difficulty in performing analytics for the online space is matching items in large datasets based on non-invasive fingerprints. For example, let's consider two or more user profile stores that include non-invasive metadata about users' browsers (e.g., IP address, user agent information, timestamps, and the like), as opposed to invasive metadata (e.g. users' installed fonts, detailed plug-in information, clock skew, and the like). If there is no explicit user identifier in the two profile stores, it is very difficult to match them. In the past, fingerprinting techniques lead to many-to-many mappings, since fingerprints are not unique. In the extreme case, using IP addresses as fingerprints does not uniquely determine users, since very often computers connect to a network with dynamic IP addresses, or they reside behind a single-IP address proxy or firewall server. Even with additional information, in most cases, a one-to-one mapping is not achieved, and soft, probabilistic (or heuristic) matching is required i.e., with a probability x<1.0 user "a" from dataset "A" is the same as user "b" from dataset "B".

Sampling methods constrained on a set of dimensions can yield a relatively good approximation of random samples in other dimensions matching datasets (user profiles, page views, advertising impression logs, click-through streams, and the like) is usually imperfect. In most cases, the mapping between two or more datasets is many-to-many. The various embodiments employ a biased methodology that selects data points that match 1:1 and verifies that the resulting distribution emulates a true random sample. Matching online user profiles by their fingerprints is typically done in a probabilistic manner. By analyzing the type of fingerprints and pre-selecting unique fingerprints from a large enough dataset, the resulting set of matched profiles is exact (no ambiguity) and behaves like a true random sample. i.e., for all practical purposes (with a small margin of error), the statistics computed on the matched profile set mimic the statistics in a random sample.

For at least one embodiment, periodic verification of a user's unique fingerprint can be determined by regenerating both an invasive and non-invasive fingerprint for the user and comparing the results to the previously identified unique fingerprint. If one of the regenerated fingerprints is different than the unique fingerprint, then the unique fingerprint is updated with the new information. However, if both of the regenerated fingerprints are different than the previously identified unique finger print, then the unique fingerprint is discarded and not used for further analytics.

Additionally, for at least one of the various embodiments, the periodic verification of user fingerprints can be performed with a self-declared set of users that affirmatively provide their unique fingerprints instead of periodically verifying the determined non-invasive fingerprints with newly computed invasive fingerprints for a sample of the user profiles.

Furthermore, although the various embodiments are described using non-invasive fingerprints to determine unique fingerprints for the plurality of user profiles, they are not so limited. Rather, at least one of the various embodiments can employ a combination of both non-invasive fingerprints and invasive fingerprints or just invasive fingerprints for determining unique fingerprints for the plurality of user profiles.

Exemplary Operating Environment

FIG. 1 illustrates an embodiment of a system in which embodiments of the present invention may operate. However, not all of the components in the depicted system may be required to practice the invention, and variations in the arrangement and type of the components may be made without departing from the spirit or scope of the invention.

As shown in the figure, system 100 includes client devices 102-103, mobile device (e.g. mobile client device) 104, network 120, wireless network 130, one or more audience fingerprint servers 106, one or more audience analytics servers 108, load balancers 110 and 112, data storage 114, content server 116 and data buyer server 118. Network 120 is in communication with and enables communication between each of the elements of system 100. Wireless network 130 further enables communication with wireless devices such as mobile device 104.

Client devices 102-104 may include virtually any computing device capable of receiving and sending a message over a network, and/or to and from another computing device. The set of such devices may include devices that typically connect using a wired communications medium such as personal computers, multiprocessor systems, microprocessor-based or programmable consumer electronics, network PCs, and the like. Further, client devices 102-104 may include any device that is capable of connecting via a wireless communication medium such as a personal digital assistant (PDA), pocket PC, wearable computer, portable computing device, mobile computing device, cell phones, smart phones, pagers, walkie talkies, radio frequency (RF) devices, infrared (IR) devices, citizen band (CB) radio devices, or any other device that is equipped to communicate over a wireless communication medium. Client devices may also include integrated devices combining one or more of the preceding devices and/or elements of one or more of the preceding devices.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like.

Network 120 is configured to couple one computing device to another computing device, enabling them to communicate. Network 120 is enabled to employ any form of computer readable media for communicating information from one electronic device to another. Also, network 120 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router, switch and/or other network appliance may act as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 120 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 120 includes any communication method by which information may travel between the various devices of system 100. Network 120 may further include one or more network management devices, which may include network providers, load balancers, application managers, or the like. Network management devices may manage communication sessions, tag communication traffic, place data cookies on client devices, and perform other network management operations.

Wireless network 130 may include wireless interfaces, wireless forms of communication media, and/or wireless links such as cellular networks, satellite links. These may include wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like.

The media used to transmit information in communication links as described above may generally include any media that can be accessed by a computing device. Such computer-readable media may include non-transitory media such as computer readable storage media, which also may be referred to as processor readable storage media. Computer-readable media may also include transitory wired and/or wireless communication media, or any combination thereof. Additionally, computer-readable media typically embodies computer-readable instructions, data structures, program modules, or other data. Such data may be stored on computer readable storage media. Such data may also be communicated through communication media in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as fluids or space for acoustic, RF, infrared, and other wireless signals, and wired media such as twisted pair, coaxial cable, fiber optics, wave guides, and other wired media.

Audience fingerprint server(s) 106, audience analytics server(s) 108, content server 116, and/or data buyer server 118 may comprise multiple computing devices, components of a single computing device, or a single device with multiple software features. In some embodiments, audience fingerprint server(s) 106 and/or audience analytics server(s) 108 may comprise a cluster of servers, such that audience analytics functionality is shared among the servers of the cluster in a load-balanced and/or parallel processing. In some embodiments, system 100 may include load balancers 110 and 112 or other network devices that manage the load balancing of tasks among audience fingerprint server(s) 106 and/or audience analytics server(s) 108 respectively.

In some embodiments, audience analytics server(s) 108 may use external data storage 114 for storing audience data. In some embodiments, audience fingerprint server(s) 106 and/or audience analytics server(s) 108 may use internal data storage for storing audience data.

Content server 116 may provide content such as web sites, online journals (e.g., blogs), photos, reviews, online services such as messaging, search, news, shopping, advertising, travel services, or virtually any other content and/or services. While providing such content or services, content server 116 may gather information about persons who access the provided content (e.g., web users, consumers and/or potential consumers), including but not limited to information such as products viewed or purchased, services viewed or purchased, articles read, content searches and the like. In some embodiments, data buyer server 118 may generally enable buyers to review, bid on, or otherwise access analytics information.

System 100 may also include data buyer server 118 that enables a data buyer or potential data buyer to use services provided by audience fingerprint server(s) 106 and/or audience analytics server(s) 108. In some embodiments, a user of data buyer server 118 may access client application(s) installed on data buyer server 118 to access services provided by audience fingerprint server(s) 106 and/or audience analytics server(s) 108, as discussed further herein. In some embodiments, a user of data buyer server 118 may access remote and/or network application(s) hosted on audience fingerprint server(s) 106 and/or audience analytics server(s) 108 to access services.

Figure 2:
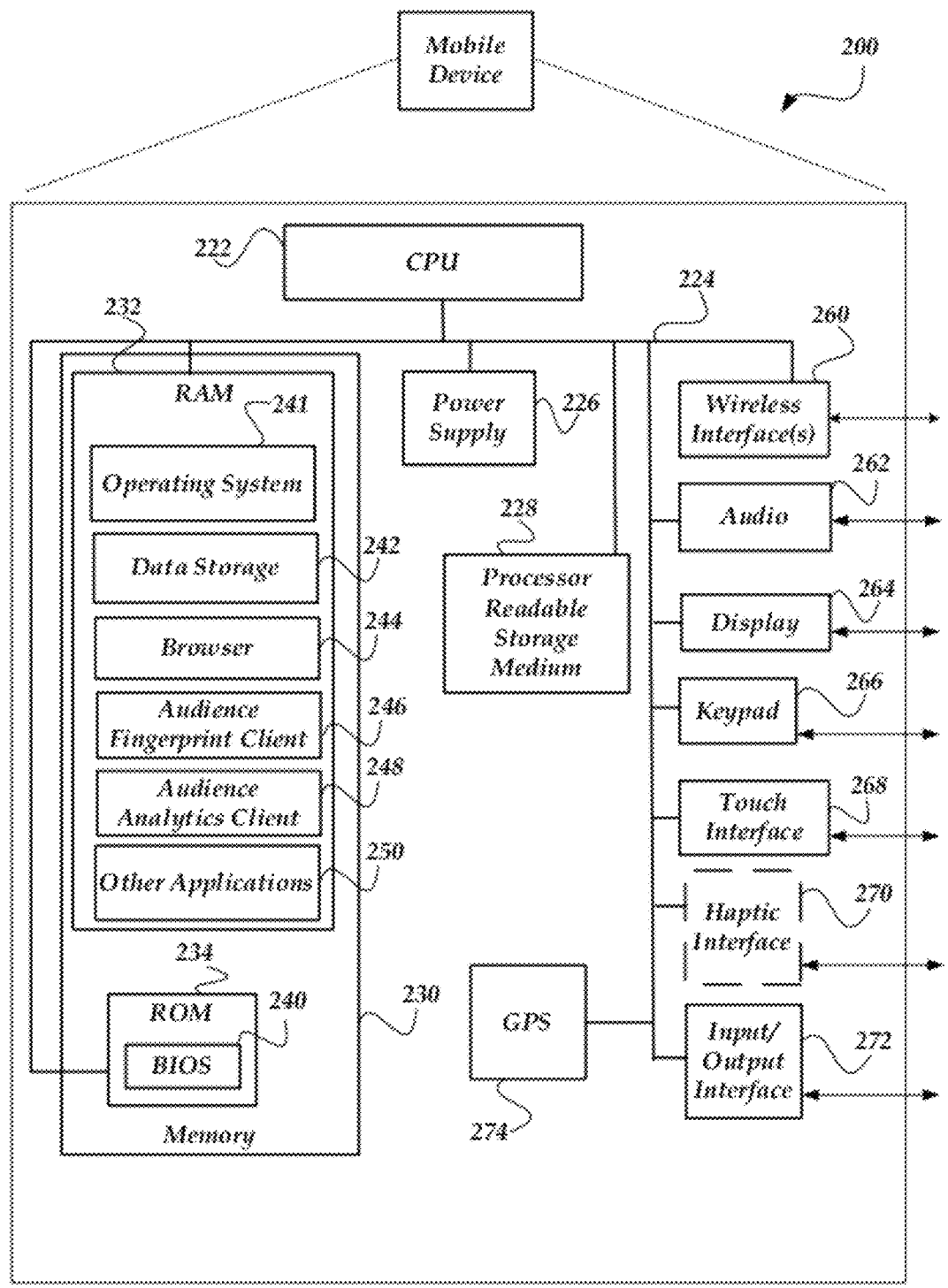
FIG. 2 shows an example of a mobile device.

FIG. 2 shows an exemplary mobile device 200. In one embodiment, mobile device 200 is a mobile client device, such as a laptop computer. Another example of a mobile device is a PDA or a cellular telephone that is arranged to send and receive voice communications and messages such as SMS messages via one or more wireless communication interfaces. Oftentimes, mobile electronic devices are capable of personal communication by connecting to one or more wireless networks, connecting to multiple nodes of a single wireless network, communicating over one or more channels to one or more networks, or otherwise engaging in one or more communication sessions. Generally, mobile device 200 may comprise any mobile or stationary electronic device. Such devices include personal computers, laptops, palmtops, PDAs, handheld computers, cellular telephones, smart phones, pagers, radio frequency (RF) devices, infrared (IR) devices, integrated devices combining one or more of the preceding devices, and the like. Mobile device 200 may also comprise other electronic devices such as multiprocessor systems, microprocessor-based or programmable consumer electronics, network PCs, wearable computers, and the like.

Mobile device 200 may include many more, or fewer, components than those shown in FIG. 2. However, the components shown are sufficient to disclose an illustrative embodiment for practicing the present invention. As shown in the figure, mobile device 200 includes a central processing unit (CPU) 222 in communication with a mass memory 230 via a bus 224.

Mass memory 230 may include RAM 232, a ROM 234, and other storage means. Mass memory 230 illustrates an example of computer storage media for storage of information such as computer readable instructions, data structures, program modules or other data. Mass memory stores a basic input/output system ("BIOS") 240 for controlling low-level operation of client device 200. The mass memory also stores an operating system 241 for controlling the operation of mobile device 200. It should be appreciated that this component may include a general purpose operating system such as a version of Windows®, UNIX, or LINUX®, or a specialized mobile communication operating system such as Apple iOS®, Google Android®, Windows Mobile™, the Symbian® operating system, or the like. The operating system may include, or interface with a Java® virtual machine module that enables control of hardware components and/or operating system operations via Java application programs.

Memory 230 further includes one or more data storage units 242, which can be utilized by mobile device 200 to store data used by various programs, applications, software modules, and the like. Mass memory 230 may also include programs, applications, and/or software modules. Browser 244 may run under the control of operating system 241 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web.

Mass memory 230 may also include an audience fingerprint client 246 that enables a user to access information regarding audience fingerprints, provided by audience fingerprint server(s) 106, described further herein. In some embodiments, mass memory 230 may also include an audience analytics client 248 that enables a user to access audience analytics information provided by audience analytics server(s) 108. In some embodiments, a user of mobile device 200 may access audience fingerprint information through browser 244, by accessing web services hosted by audience fingerprint server(s) 106 and/or audience analytics server(s) 108. In some embodiments, access to the functionality of the audience fingerprint server(s) and/or audience analytics server(s) may be provided to the client via an API. A data buyer and/or third party may create one or more applications that employ the API to access the fingerprint and/or analytics functionality. Mass memory 230 may also include other applications 250.

Mobile device 200 may also include a processor readable storage media 228. Processor readable storage media may include volatile, nonvolatile, removable, and non-removable media implemented in any method or technology for storage of information, such as computer- or processor-readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device. Processor readable storage media may also be referred to herein as computer readable storage media.

Mobile device 200 also includes a power supply 226, one or more wireless interfaces 260, an audio interface 262, a display 264, a keypad 266, a touch interface 268, an input/output interface 272, a haptic interface 270, and a global positioning systems (GPS) transceiver 274. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station, or directly with another mobile device. Wireless interface 260 may include circuitry for coupling mobile device 200 to one or more wireless networks, and is constructed for use with one or more communication protocols and technologies including, but not limited to, TCP/IP, UDP, GSM, CDMA, TDMA, SMS, GPRS, WAP, UWB, IEEE 802.16 (WiMax), and the like.

Audio interface 262 is arranged to produce and/or receive audio signals such as the sound of a human voice, music, and the like. For example, audio interface 262 may be coupled to a speaker and microphone (not shown) to enable telecommunication with others and/or generate an audio acknowledgement for some action. Display 264 may be a liquid crystal display (LCD), gas plasma, light emitting diode (LED), or any other type of display used with a client device. Display 264 may also include a touch sensitive screen arranged to receive input from an object such as a stylus or a digit from a human hand.

Keypad 266 may comprise any input device arranged to receive input from a user. For example, keypad 266 may include a keyboard, a push button numeric dial, or the like. Keypad 266 may also include command buttons that are associated with selecting and performing changeable processes. Touch interface 268 enables a user to select items or functionality by single touches, multiple touches, and/or gestures on the surface of display 264.

Client device 200 may also include input/output interface 272 for communicating with external devices, such as a headset, or other input or output devices not shown in FIG. 2. Input/output interface 272 can utilize one or more communication technologies, such as USB, infrared, Bluetooth™, and the like. Haptic interface 270 is arranged to provide tactile feedback to a user of the client device. For example, the haptic interface may be employed to vibrate client device 200 in a particular way when another user of a client device is calling.

GPS transceiver 274 can determine the physical coordinates of client device 200 on the surface of the Earth, which typically outputs a location as latitude and longitude values. GPS transceiver 274 can also employ other geo-positioning mechanisms, including, but not limited to, triangulation, assisted GPS (AGPS), Enhanced Observed Time Difference (E-OTD), cell identifier (CI), service area identifier (SAT), enhanced timing advance (ETA), base station subsystem (BSS), or the like, to further determine the physical location of client device 200 on the surface of the Earth. It is understood that under different conditions, GPS transceiver 274 can determine a physical location within millimeters for client device 200; and in other cases, the determined physical location may be less precise, such as within a meter or significantly greater distances.

Figure 3:
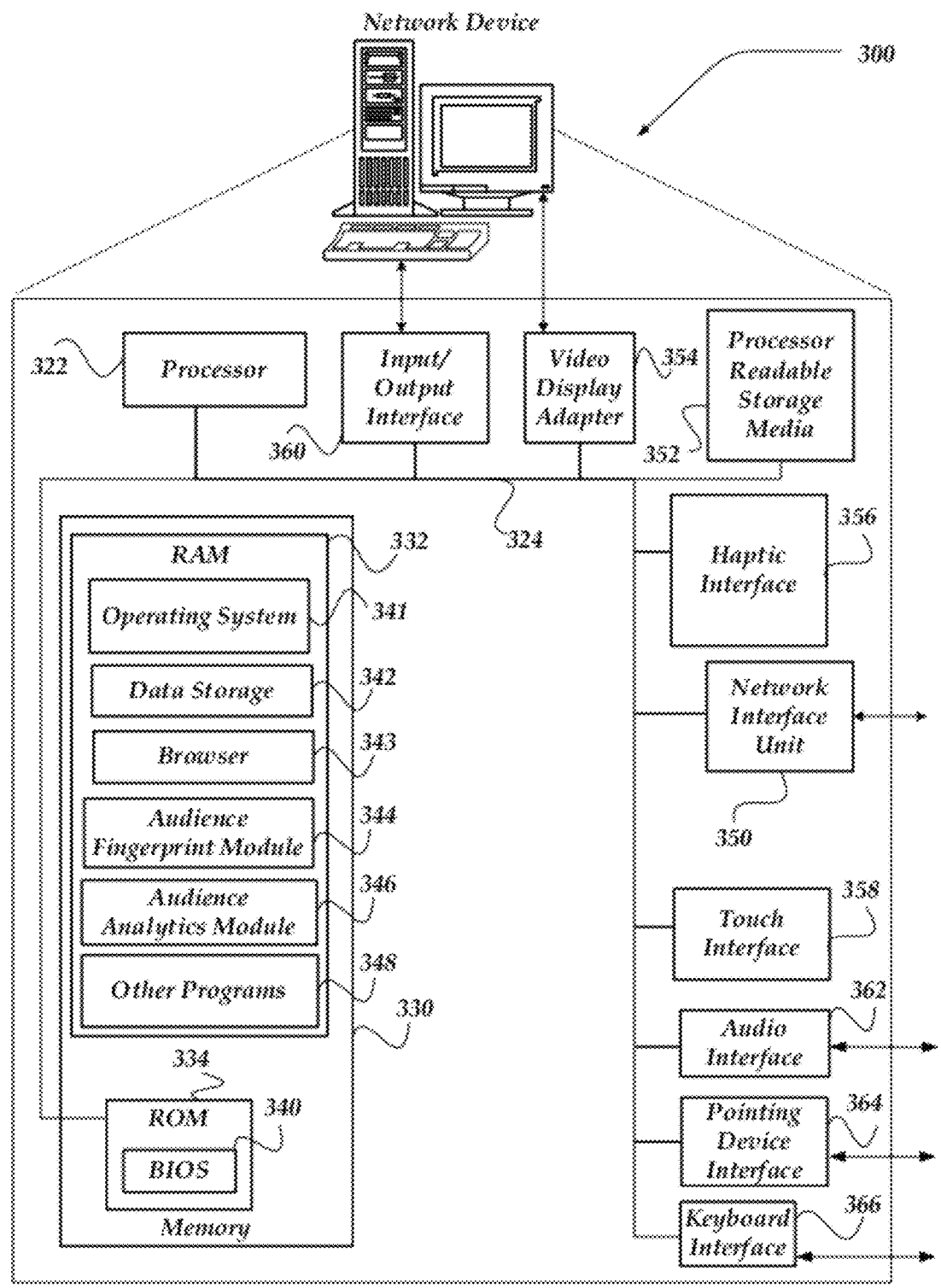
FIG. 3 illustrates an example of a network device.

FIG. 3 shows one embodiment of a network device, according to at least one of the embodiments. Network device 300 may include many more, or fewer, components than those shown. The components shown, however, are sufficient to disclose an illustrative embodiment. Network device 300 may represent, for example, audience fingerprint server(s) 106, audience analytics server(s) 108, client devices (e.g. desktop personal computers) such as client device 102, content server 116, and/or data buyer 118 of FIG. 1.

As shown in FIG. 3, network device 300 includes processor 322 in communication with mass memory 330 via bus 324. Mass memory 330 may include RAM 332, ROM 334, and other storage means. Mass memory 330 illustrates an example of computer storage media for storage of information such as computer readable instructions, data structures, program modules or other data. Mass memory stores a basic input/output system ("BIOS") 340 for controlling low-level operation of network device 300. The mass memory also stores an operating system 341 for controlling the operation of network device 300. It should be appreciated that this component may include a general purpose operating system such as a version of Windows®, UNIX, or LINUX®, or a specialized mobile communication operating system such as Apple iOS®, Google Android®, Windows Mobile™, the Symbian® operating system, or the like. The operating system may include, or interface with a Java® virtual machine module that enables control of hardware components and/or operating system operations via Java application programs.

Memory 330 further includes one or more data storage units 342, which can be utilized by network device 300 to store programs, applications, software modules, and the like, as well as the data used by such programs, applications, and/or software modules. Programs may comprise computer executable instructions which can be executed by network device 300. Programs in mass memory 330 may include a browser application 343. Browser 343 may run under the control of operating system 341 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web. Mass memory 330 may also include an audience fingerprint module 344 that enables access to audience fingerprint information, provided by audience fingerprint server(s) 106, described further herein. In some embodiments, mass memory 330 may also include an audience analytics module 346 that enables access to audience analytics information provided by audience analytics server(s) 108. Mass memory 330 may also include other applications 348. Other examples of application programs include content management applications, messaging applications, schedulers, calendars, web services, transcoders, database programs, word processing programs, spreadsheet programs, and so forth. Accordingly, programs may process images, audio, video, or markup pages, enable telecommunication with another user of another electronic device, and/or other services.

Network device 300 also includes an input/output interface 360 for communicating with input/output devices such as a Joystick, mouse, wheel, touch pad, rocker switches, keypad, printer, scanner, modem, video camera, modem, and/or other input devices not specifically shown in FIG. 3. A user of server device 300 can use input/output devices to interact with a user interface that may be separate or integrated with operating system 341, and/or programs in memory 330. Interaction with the user interface includes visual interaction via a display coupled to video display adapter 354. The user interface can also include haptic interface 356, touch interface 358, pointing device interface 364, keyboard interface 366, and audio interface 362.

Network device 300 may include processor readable storage media 352. Processor readable storage media 352 can comprise one or more of an optical disc drive, flash memory drive, hard drive, a floppy disk drive, tape drive, and/or any other type of removable storage media drive. Permanent or removable processor readable storage media may include volatile, nonvolatile, removable, and non-removable media implemented in any method or technology for storage of information, such as processor readable instructions, data structures, program modules, or other data. Examples of processor readable storage media include a CD-ROM, digital versatile disks (DVD) or other optical storage, magnetic cassettes, magnetic tape, magnetic disk storage or other magnetic storage devices, RAM, ROM, EEPROM, flash memory or other memory technology, or any other media which can be used to store the desired information and which can be accessed by a computing device.

Via a network communication interface unit 350, server device 300 can communicate with a wide area network such as the Internet, a local area network, a wired telephone network, a cellular telephone network, or some other communications network, such as networks 120 and/or 130 in FIG. 1.

Exemplary Processes

Figure 4:
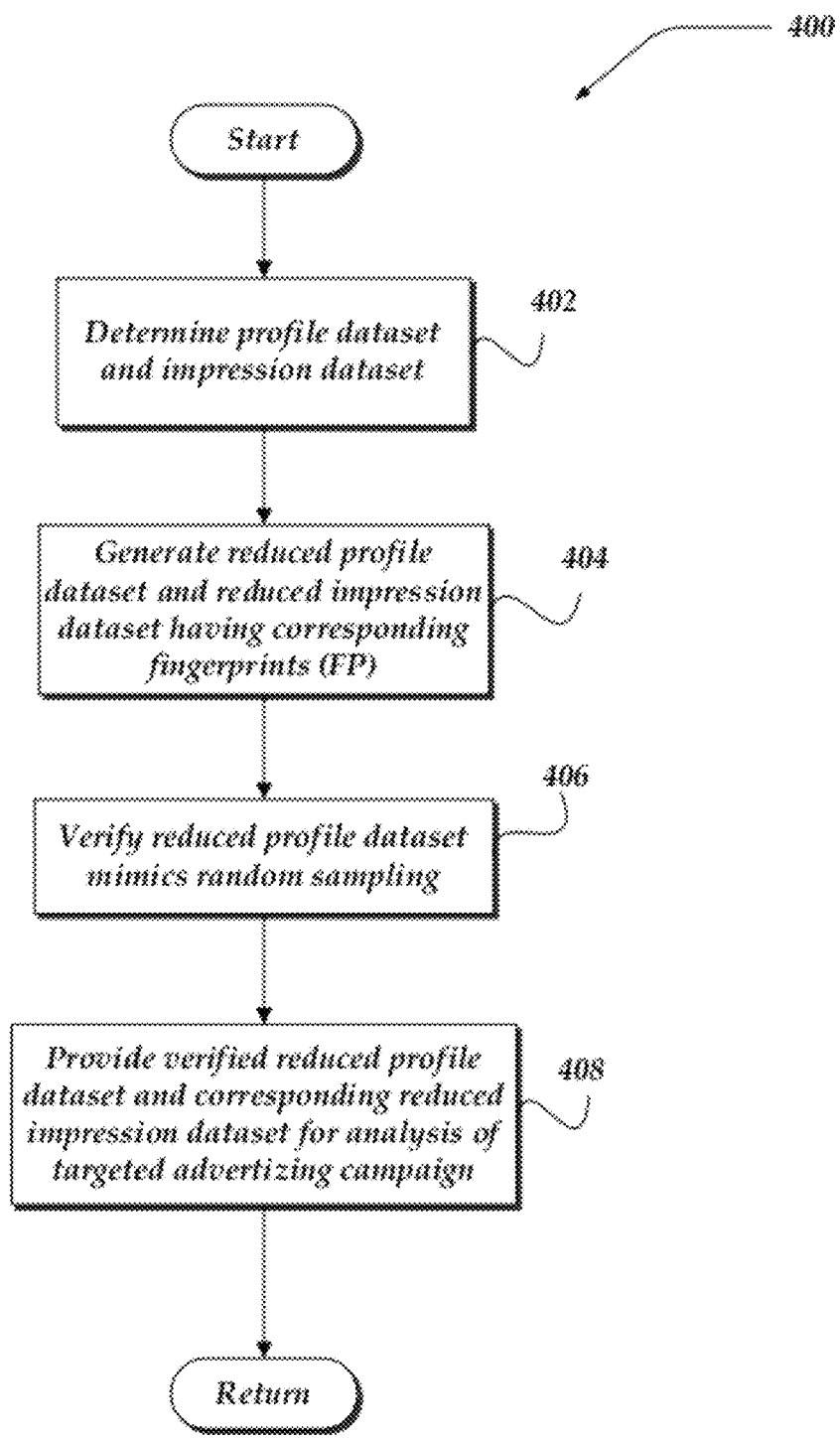
FIG. 4 shows a flowchart for an exemplary process for generating profile and impression datasets that are employed for analytics of a targeted advertising campaign.

FIG. 4 shows a flow chart for an exemplary process 400 where profile and impression datasets are generated that are provided for analyzing a targeted advertising campaign. Moving from start block, the process steps to block 402 where a dataset of user profiles and another dataset for impressions of a targeted advertising campaign are determined. Flowing to block 404, the process generates a reduced dataset of user profiles having non-invasive fingerprints and a reduced impression dataset having non-invasive fingerprints where the fingerprints from each dataset correspond to each other. Also, at least one embodiment for the generating process at block 404 is illustrated in somewhat more detail in FIG. 5 and the corresponding discussion herein.

At block 406, the process verifies that the reduced profile dataset mimics a random sampling from the previously determined profile dataset. Advancing to block 408, the process provides the verified reduced profile dataset and the reduced impression dataset for analysis of a targeted advertising campaign. Next, the process returns to performing other actions.

Figure 5:
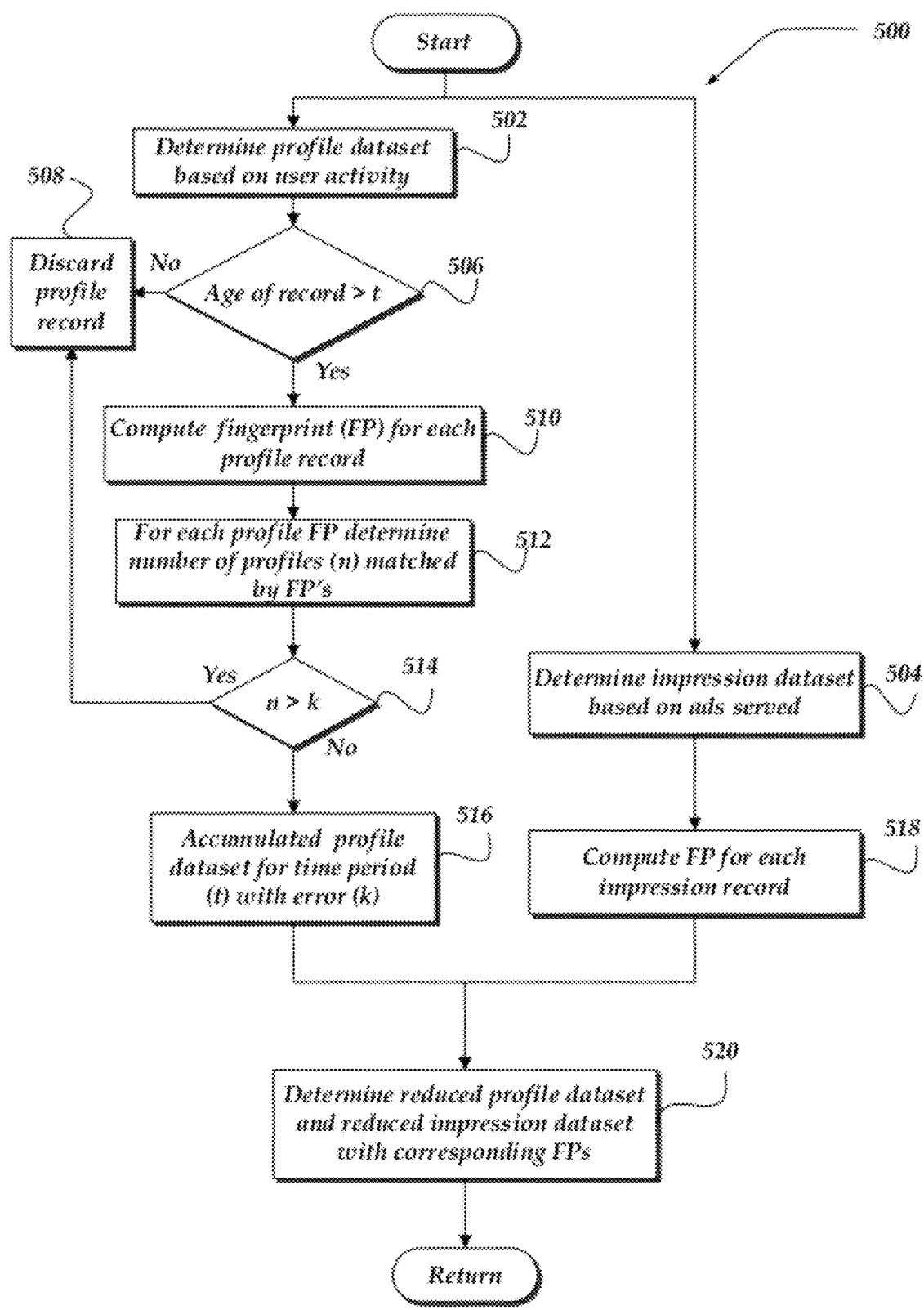
FIG. 5 illustrates a flowchart for an exemplary process for generating a verified profile dataset and impression dataset having fingerprints that correspond to each other in accordance with the various embodiments.

FIG. 5 illustrates a flowchart for an exemplary process for generating a verified profile dataset and impression dataset having non-invasive fingerprints that correspond to each other in accordance with the various embodiments. The process shown in FIG. 5 is one embodiment of the process discussed in regard to block 404 of FIG. 4.

Moving from a start block, the process flows in two paths. The first path flows to block 502 where a profile dataset is determined based at least in part on user activity. At decision block 506, a determination is made as to whether an age of a record for each profile is greater than a determined time period "t". If negative, the process moves to block 508 where each profile record with an age less than the "t" time period is discarded. However, if the determination is affirmative, the process flows to block 510 where a non-invasive fingerprint is calculated for each profile record with greater than the "t" time period. Examples for computing such non-invasive fingerprints are discussed in further detail elsewhere in the Specification.

Advancing to block 512, a determination is made for each profile record as to the number "n" of other profile records that have the same (matching) non-invasive fingerprint. Stepping to decision block 514, a determination is made for each profile record whether it's corresponding "n" number is greater than a determined error number "k". If the determination at decision block 514 is true, the corresponding profile records is discarded by the process at block 508 as discussed above. However, if the determination is false at decision block 514 the process flows to block 516 where the profile records having the number "n" that is less than the error rate "k" and an age greater than time "t" are accumulated.

Additionally, the process has moved from the start block on the second path to block 504 where another dataset is determined based at least in part on impressions for advertisements served in a targeted advertising campaign. The process moves on the second path to block 518 where a non-invasive fingerprint for each record of the impression dataset is computed.

The process flows along the first path from block 516 and also along the second path from block 518 to block 520 where another determination is made for a reduced profile dataset having non-invasive fingerprints that correspond to a portion of the impression dataset that also has non-invasive fingerprints that correspond to those in the reduced profile dataset. Next, the process returns to performing other actions.

It should be understood that figures, and combinations of steps in the illustrations, can be implemented by computer program instructions. These program instructions may be provided to a processor to produce a machine, such that the instructions executing on the processor create a means for implementing the actions. The computer program instructions may 10 be executed by a processor to cause a series of operational steps to be performed by the processor to produce a computer implemented process for implementing the actions specified in the flowchart block or blocks. These program instructions may be stored on some type of machine readable media, such as processor readable non-transitive storage media, and the like.

What is claimed as new and desired to be protected by Letters Patent of the United States is:

1. A computer-implemented method, the method comprising:
    aggregating, at a server, interaction data from one or more databases, the interaction data representing a plurality of browser interactions with one or more webpages, each browser interaction of the plurality of browser interactions being associated with a browser operating on a computing device, the interaction data including a plurality of information items that are combinable to identify the browser at which the browser interaction occurred, each information item of the plurality of information items being automatically provided by the browser during the browser interaction, and the plurality of information items comprising at least cookie data collected by a cookie stored at the browser, a browser version indicating a version of the browser, and a screen resolution indicating a resolution associated with the computing device;
    determining, at the server, a profile dataset based on the interaction data, the profile dataset defining a plurality of user profiles, each user profile of the plurality of user profiles being characterized by at least a portion of the interaction data;
    generating, at the server and for each user profile of the plurality of user profiles, a first non-invasive fingerprint that represents an identifier of the user profile, the first non-invasive fingerprint being generated by computing a hash of a first string of information items from amongst the plurality of information items, the first string of information items corresponding to multiple information items combined together in a string of data to identify the user profile, the multiple information items comprising at least the cookie data, the browser version, and the screen resolution, and the first non-invasive fingerprint being persistent so as to identify the user profile even after the cookie data has been cleared from the browser,
    accessing, at the server, an impression record dataset including a plurality of impression records, each impression record of the plurality of impression records having been recorded in response to loading of a webpage object on a computing device using a browser, and the recording each impression record of the plurality of impression records causing one or more information items of the plurality of information items to be stored in association with the impression record;
    generating, at the server and for each impression record of the plurality of impression records, a second non-invasive fingerprint that represents an identifier of for the impression record, the second non-invasive fingerprint being generated by computing a hash of a second string of information items from amongst the plurality of information items, the second string of information items corresponding to multiple information items combined together in a string of data to identify the impression record;
    defining a sample dataset that includes a subset of the profile dataset, each user profile in the subset of the profile dataset corresponding to a unique first non-invasive fingerprint that is different from remaining first non-invasive fingerprints included in each user profile of the subset of the profile dataset;
    determining, for each user profile included in the subset of the profile dataset, whether the first non-invasive fingerprint associated with the user profile is a same as any of the second non-invasive fingerprints included in the impression record dataset; and
    in response to determining that the first non-invasive fingerprint is the same as one of the second non-invasive fingerprints included in the impression record dataset, generating, based at least in part on the sample dataset and the impression record dataset, a merged dataset that includes a plurality of data elements, each data element of the plurality of data elements corresponding to a one-to-one mapping between a particular user profile from the sample dataset and a particular impression record from the impression record dataset, the particular user profile being represented by a particular first non-invasive fingerprint and the particular impression record being represented by a particular second non-invasive fingerprint, and the one-to-one mapping indicating that the particular first non-invasive fingerprint and the particular second non-invasive fingerprint are the same, which represents that the particular user profile and the particular impression record are associated with a same browser.

2. The method of claim 1, further comprising:
    computing a first non-invasive fingerprint virtual ID for each remaining user profile based at least in part upon an operating system, one or more plug-in applications, installed fonts after defining a sample dataset of the profile dataset;

identifying a predetermined number of user profiles;
identifying a predetermined time period with a tolerated unique margin of error;
generating a set of first non-invasive fingerprints that uniquely identify the plurality of user profiles within the predetermined time period with the tolerated unique margin of error;
computing one or more second non-invasive fingerprints from the plurality of impression records in the impression record dataset;
generating the merged dataset at least by joining a portion of the impression record dataset and a portion of profile dataset while keeping multiple impression records and user profiles with respective non-invasive fingerprints in both the portion of the impression record dataset and the portion of profile dataset;
generating an estimated confidence for correspondence between the merged dataset and the plurality of user profiles; and
verifying correctness of the merged dataset at least by comparing a set of statistics including an average profile size, a frequency of a particular profile attribute, one or more average distributions, or any combinations thereof.

3. The computer-implemented method of claim 1, further comprising computing a first non-invasive fingerprint based in part or in whole on identifying at least one string of information sufficient to identify a browser application.

4. The method of claim 3, wherein the first or second string of information includes at least one of a browser version, an operating system version, natural language, a toolbar, an HTTP header, a Cookie, display resolution, a time zone, a font size, font type, a supercookie, an HTML 5 database, DOM global storage, an IP address, an IP address subnet, and an Autonomous System Number.

5. The method of claim 1, wherein determining a profile dataset having a plurality of user profiles further comprising:
pre-selecting the unique first non-invasive fingerprints for a random sample of the plurality of user profiles; and
comparing the unique first non-invasive fingerprints to computed first non-invasive fingerprints for the plurality of user profiles included in the portion of the profile dataset, wherein an affirmative comparison result enables a verification of randomness of the plurality of user profiles included in the portion of the profile dataset.

6. The method of claim 1, further comprising:
pre-selecting the unique first non-invasive fingerprints provided by a set of users from the plurality of user profiles; and
comparing the unique first non-invasive fingerprints to computed first non-invasive fingerprints for the plurality of user profiles included in the portion of the profile dataset, wherein an affirmative comparison result enables a verification of randomness of the plurality of user profiles included in the portion of the profile dataset, wherein an analysis of information generated comprises at least one of assessing a performance of a targeted advertising campaign, providing an actionable insight regarding users to whom advertisements are served, and optimizing the advertisements served for the targeted advertising campaign.

7. The method of claim 1, further comprising:
identifying a plurality of strings of information;
identifying a browser by using the plurality of strings of information;
assigning a first non-invasive fingerprint by using the plurality of strings of information;
performing analytics for contents and metric data for the impression record dataset;
identifying a browser by using the plurality of strings of information;
generating temporally unique persistent non-invasive fingerprints;
performing analytics at least by sampling the merged dataset with a non-random sampling methodology, ensuring sampling is correct at least by mimicking one or more properties of the merged dataset;
determining the merged dataset at least by employing a biased methodology that selects a resulting distribution comprising data points that probabilistically match one-to-one and by verifying whether the resulting distribution emulates a random sample;
performing periodic verification of a unique first non-invasive fingerprint of a user that uniquely identifies the user profile at least by generating both an invasive fingerprint and a non-invasive fingerprint for the user, by comparing one or both of the invasive fingerprint and the non-invasive fingerprint for the user to the user's unique first non-invasive fingerprint, by discarding the user's unique first non-invasive fingerprint when both the invasive fingerprint and the non-invasive fingerprint for the user are different from the user's unique first non-invasive fingerprint; and
generating a unique fingerprint that corresponds to at least one user profile for the user from an invasive fingerprint.

8. A system for generating information, comprising:
a server device, including:
a memory for storing data; and
a processor for executing instructions that perform actions, comprising:
aggregating, at a server, interaction data from one or more databases, the interaction data representing a plurality of browser interactions with one or more webpages, each browser interaction of the plurality of browser interactions being associated with a browser operating on a computing device, the interaction data including a plurality of information items that are combinable to identify at which the browser interaction occurred, each information item of the plurality of information items being automatically provided by the browser during the browser interaction, and the plurality of information items comprising at least cookie data collected by a cookie stored at the browser, a browser version indicating a version of the browser, and a screen resolution indicating a resolution associated with the computing device;
determining, at the server, a profile dataset based on the interaction data, the profile dataset defining a plurality of user profiles, each user profile of the plurality of user profiles being characterized by at least a portion of the interaction data;
generating, at the server and for each user profile of the plurality of user profiles, a first non-invasive fingerprint that represents an identifier of the user profile, the first non-invasive fingerprint being generated by computing a hash of a first string of information items from amongst the plurality of information items, the first string of information items corresponding to multiple information items combined together in a string of data to identify the user profile, the multiple information items comprising at least the cookie data, the browser version, and the screen resolution, and the first non-invasive fingerprint being persistent so as to identify the user profile even after the cookie data has been cleared from the browser;

accessing, at the server, an impression record dataset including a plurality of impression records, each impression record of the plurality of impression records having been recorded in response to loading of a webpage object on a computing device using a browser, and the recording each impression record of the plurality of impression records causing one or more information items of the plurality of information items to be stored in association with the impression record;

generating, at the server and for each impression record of the plurality of impression records, a second non-invasive fingerprint that represents an identifier of the impression record, the second non-invasive fingerprint being generated by computing a hash of a second string of information items from amongst the plurality of information items, the second string of information items corresponding to multiple information items combined together in a string of data to identify the impression record;

defining a sample dataset that includes a subset of the profile dataset, each user profile in the subset of the profile dataset corresponding to a unique first non-invasive fingerprint that is different from remaining first non-invasive fingerprints included in each user profile of the subset of the profile dataset; and in response to determining that the first non-invasive fingerprint is a same as one of the second non-invasive fingerprints included in the impression record dataset, generating, based at least in part on the sample dataset and the impression record dataset, a merged dataset that includes a plurality of data elements, each data element of the plurality of data elements corresponding to a one-to-one mapping between a particular user profile from the sample dataset and a particular impression record from the impression record dataset, the particular user profile being represented by a particular first non-invasive fingerprint and the particular impression record being represented by a particular second non-invasive fingerprint, and the one-to-one mapping indicating that the particular first non-invasive fingerprint and the particular second non-invasive fingerprint are the same, which represents that the particular user profile and the particular impression record are associated with a same browser.

9. The system of claim 8, wherein the processor of the server device performs further actions comprising discarding a user profile record from the profile dataset when an age of the user profile record is less than a predetermined time period.

10. The system of claim 8, further comprising computing a first non-invasive fingerprint based in part or in whole on identifying at least one string of information sufficient to identify a browser application.

11. The system of claim 10, wherein the at least one string of information includes at least one of a browser version, an operating system version, natural language, a toolbar, an HTTP header, a Cookie, display resolution, a time zone, a font size, a font type, a supercookie, an HTML 5 database, DOM global storage, an IP address, an IP address subnet, and an Autonomous System Number.

12. The system of claim 8, wherein the server device's processor performs further actions comprising:
pre-selecting unique first non-invasive fingerprints for a random sample of the plurality of user profiles; and
comparing the pre-selected unique first non-invasive fingerprints to compute non-invasive fingerprints for the plurality of user profiles included in the portion of the profile dataset, wherein an affirmative comparison result enables a verification of randomness of the plurality of user profiles included in the portion of the profile dataset.

13. The system of claim 8, wherein the server device's processor performs further actions comprising:
pre-selecting the unique first non-invasive fingerprints provided by a set of users from the plurality of user profiles; and
comparing the unique first non-invasive fingerprints to computed non-invasive fingerprints for the plurality of user profiles included in the portion of the profile dataset, wherein an affirmative comparison result enables a verification of randomness of the plurality of user profiles included in the portion of the profile dataset.

14. The system of claim 8, wherein an analysis of the information generated comprises at least one of assessing a performance of a targeted advertising campaign, providing an actionable insight regarding users to whom advertisements are served, and optimizing the advertisements served for the targeted advertising campaign.

15. A processor readable non-transitory storage medium that is arranged to store instructions for generating information regarding a targeted advertising campaign, wherein a processor executing the instructions causes actions to be performed, comprising:
aggregating, at a server, interaction data from one or more databases, the interaction data representing a plurality of browser interactions with one or more webpages, each browser interaction of the plurality of browser interactions being associated with a browser operating on a computing device, the interaction data including a plurality of information items that are combinable to identify the browser at which the browser interaction occurred, each information item of the plurality of information items being automatically provided by the browser during the browser interaction, and the plurality of information items comprising at least cookie data collected by a cookie stored at the browser, a browser version indicating a version of the browser, and a screen resolution indicating a resolution associated with the computing device;
determining, at the server, a profile dataset based on the interaction data, the profile dataset defining a plurality of user profiles, each user profile of the plurality of user profiles being characterized by at least a portion of the interaction data;
generating, at the server and for each user profile of the plurality of user profiles, a first non-invasive fingerprint that represents an identifier of the user profile, the first non-invasive fingerprint being generated by computing a hash of a first string of information items from amongst the plurality of information items, the first string of information items corresponding to multiple information items combined together in a string of data to identify the user profile, the multiple information items comprising at least the cookie data, the browser version, and the screen resolution, and the first non-invasive fingerprint being persistent so as to identify the user profile even after the cookie data has been cleared from the browser;

accessing, at the server, an impression record dataset including a plurality of impression records, each impression record of the plurality of impression records having been recorded in response to loading of a webpage object on a computing device using a browser, and the recording each impression record of the plurality of impression records causing one or more information items of the plurality of information items to be stored in association with the impression record;

generating, at the server and for each impression record of the plurality of impression records, a second non-invasive fingerprint that represents an identifier of the impression record, the second non-invasive fingerprint being generated by computing a hash of a second string of information items from amongst the plurality of information items, the second string of information items corresponding to multiple information items combined together in a string of data to identify the impression record;

defining a sample dataset that includes a subset of the profile dataset, each user profile in the subset of the profile dataset corresponding to a unique first non-invasive fingerprint that is different from remaining first non-invasive fingerprints included in each user profile of the subset of the profile dataset;

determining, for each user profile included in the subset of the profile dataset, whether the first non-invasive fingerprint associated with the user profile is a same as any of the second non-invasive fingerprints included in the impression record dataset; and in response to determining that the first non-invasive fingerprint is the same as one of the second non-invasive fingerprints included in the impression record dataset, generating, based at least in part on the sample dataset and the impression record dataset, a merged dataset that includes a plurality of data elements, each data element of the plurality of data elements corresponding to a one-to-one mapping between a particular user profile from the sample dataset and a particular impression record from the impression record dataset, the particular user profile being represented by a particular first non-invasive fingerprint and the particular impression record being represented by a particular second non-invasive fingerprint, and the one-to-one mapping indicating that the particular first non-invasive fingerprint and the particular second non-invasive fingerprint are the same, which represents that the particular user profile and the particular impression record are associated with a same browser.

16. The processor readable non-transitory stroage medium of claim 15, wherein the actions further comprise discarding a user profile record from the profile dataset when an age of the user profile record is less than a predetermined time period.

17. The processor readable non-transitory storage medium of claim 15, wherein the actions further comprising computing a first non-invasive fingerprint based in part or in whole on identifying at least one string of information sufficient to identify a browser application.

18. The processor readable non-transitory storage medium of claim 15, wherein the actions further comprise:
pre-selecting unique first non-invasive fingerprints for a sample of a plurality of user profiles; and comparing the pre-selected unique first non-invasive fingerprints to compute non-invasive fingerprints for the user profiles included in the portion of the profile dataset, wherein an affirmative comparison enables a verification of randomness of the user profiles included in the portion of the profile dataset.

19. The processor readable non-transitory storage medium of claim 15, wherein the actions further comprise:
pre-selecting the unique first non-invasive fingerprints provided by a set of users from the plurality of user profiles; and
comparing the unique first non-invasive fingerprints to computed non-invasive fingerprints for the plurality of user profiles included in the portion of the profile dataset, wherein an affirmative comparison result enables a verification of randomness of the plurality of user profiles included in the portion of the profile dataset.

20. An apparatus for generating information regarding a targeted advertising campaign, comprising:
a memory for storing data; and
a processor for executing instructions that perform actions, including:
aggregating, at a server, interaction data from one or more databases, the interaction data representing a plurality of browser interactions with one or more webpages, each browser interaction of the plurality of browser interactions being associated with a browser operating on a computing device, the interaction data including a plurality of information items that are combinable to identify the browser at which the browser interaction occurred, each information item of the plurality of information items being automatically provided by the browser during the browser interaction, and the plurality of information items comprising at least cookie data collected by a cookie stored at the browser, a browser version indicating a version of the browser, and a screen resolution indicating a resolution associated with the computing device;

determining, at the server, a profile dataset based on the interaction data, the profile dataset defining a plurality of user profiles, each user profile of the plurality of user profiles being characterized by at least a portion of the interaction data;

generating, at the server and for each user profile of the plurality of user profiles, a first non-invasive fingerprint that represents an identifier of the user profile, the first non-invasive fingerprint being generated by computing a hash of a first string of information items from amongst the plurality of information items, the first string of information items corresponding to multiple information items combined together in a string of data to identify the user profile, the multiple information items comprising at least the cookie data, the browser version, and the screen resolution, and the first non-invasive fingerprint being persistent so as to identify the user profile even after the cookie data has been cleared from the browser;

accessing, at the server, an impression record dataset including a plurality of impression records, each impression record of the plurality of impression records having been recorded in response to loading of a webpage object on a computing device using a browser, and the recording each impression record of the plurality of impression records causing one or more information items of the plurality of information items to be stored in association with the impression record;

generating, at the server and for each impression record of the plurality of impression records, a second non-invasive fingerprint that represents an identifier of the impression record, the second non-invasive fingerprint being generated by computing a hash of a second string of information items from amongst the plurality of information items, the second string of information items corresponding to multiple information items combined together in a string of data to identify the impression record;

defining a sample dataset that includes a subset of the profile dataset, each user profile in the subset of the profile dataset corresponding to a unique first non-invasive fingerprint that is different from remaining first non-invasive fingerprints included in each user profile of the subset of the profile dataset;

determining, for each user profile included in the subset of the profile dataset, whether the first non-invasive fingerprint associated with the user profile is a same as any of the second non-invasive fingerprints included in the impression record dataset; and in response to determining that the first non-invasive fingerprint is the same as one of the second non-invasive fingerprints included in the impression record dataset, generating, based at least in part on the sample dataset and the impression record dataset, a merged dataset that includes a plurality of data elements, each data element of the plurality of data elements corresponding to a one-to-one mapping between a particular user profile from the sample dataset and a particular impression record from the impression record dataset, the particular user profile being represented by a particular first non-invasive fingerprint and the particular impression record being represented by a particular second non-invasive fingerprint, and the one-to-one mapping indicating that the particular first non-invasive fingerprint and the particular second non-invasive fingerprint are the same, which represents that the particular user profile and the particular impression record are associated with a same browser.

21. The apparatus of claim 20, wherein the actions further comprise discarding a user profile record from the profile dataset when an age of the user profile record is less than a predetermined time period.

22. The apparatus of claim 20, wherein the actions further comprises computing a first non-invasive fingerprint based in part or in whole on identifying at least one string of information sufficient to identify a browser application.

23. The apparatus of claim 20, wherein the actions further comprise:
pre-selecting the unique first non-invasive fingerprints for a random sample of the plurality of user profiles; and
comparing the unique first non-invasive fingerprints to computed non-invasive fingerprints for the plurality of user profiles included in the portion of the profile dataset, wherein an affirmative comparison result enables a verification of randomness of the plurality of user profiles included in the portion of the profile dataset.

24. The apparatus of claim 20, wherein the actions further comprise:
pre-selecting the unique first non-invasive fingerprints provided by a set of users from the plurality of user profiles; and
comparing the unique first non-invasive fingerprints to computed non-invasive fingerprints for the plurality of user profiles included in the portion of the profile dataset, wherein an affirmative comparison result enables a verification of randomness of the random sample of the profile dataset.

25. The method of claim 1, further comprising computing a first non-invasive fingerprint at least by generating a hash.

26. The system of claim 8, wherein the actions further comprise computing a first non-invasive fingerprint at least by generating a hash.

27. The processor readable non-transitory storage medium of claim 15, wherein the actions further comprise computing a first non-invasive fingerprint at least by generating a hash.

28. The apparatus of claim 20, wherein the actions further comprise computing a first non-invasive fingerprint at least by generating a hash.

29. The method of claim 1, further comprising:
periodically verifying the first non-invasive fingerprint by regenerating both an invasive fingerprint and the first non-invasive fingerprint and comparing each of the invasive fingerprint and the first non-invasive fingerprint to a previously-identified unique fingerprint.

* * * * *